July 2, 1957
G. L. ATHERHOLT ET AL
2,797,604
HYDROSTATIC HOLDING DEVICE
Filed Feb. 5, 1954
2 Sheets-Sheet 1
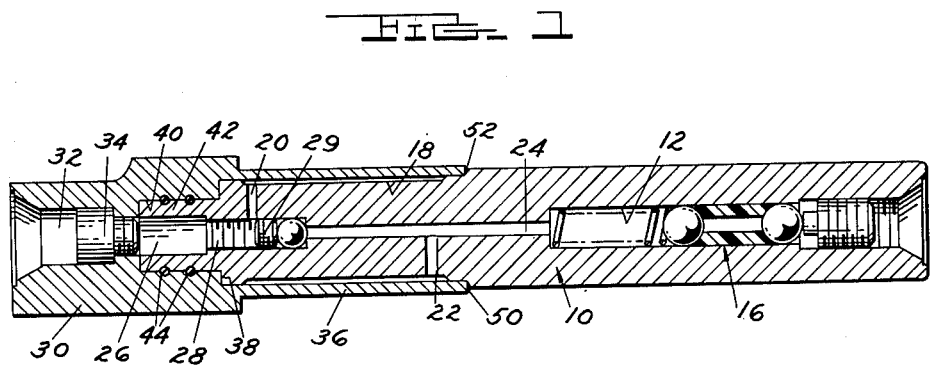
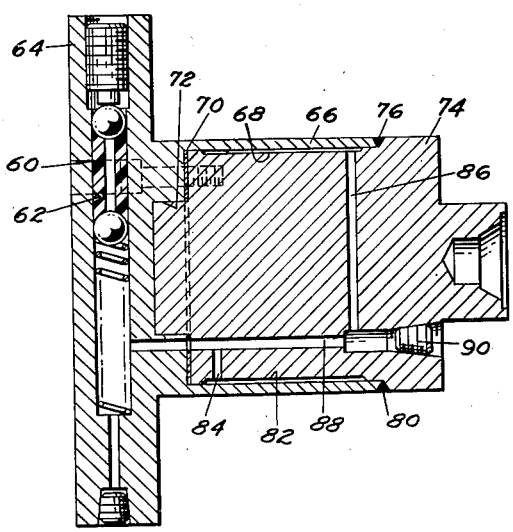
INVENTORS
GEORGE L. ATHERHOLT
GEORGE L. ATHERHOLT JR.
BY
Barnes, Kisselle, Laughlin & Raisch
ATTORNEYS

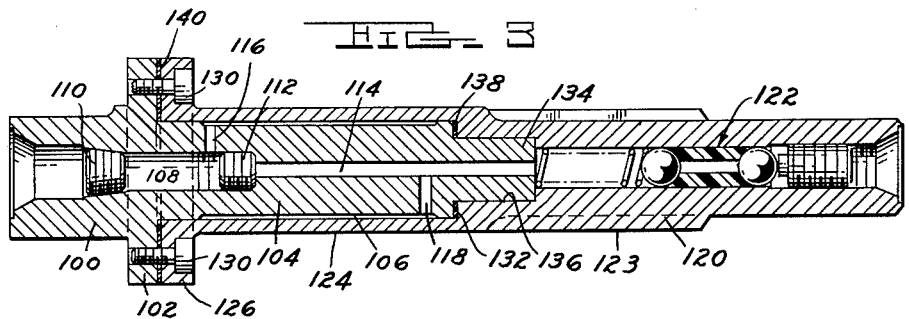
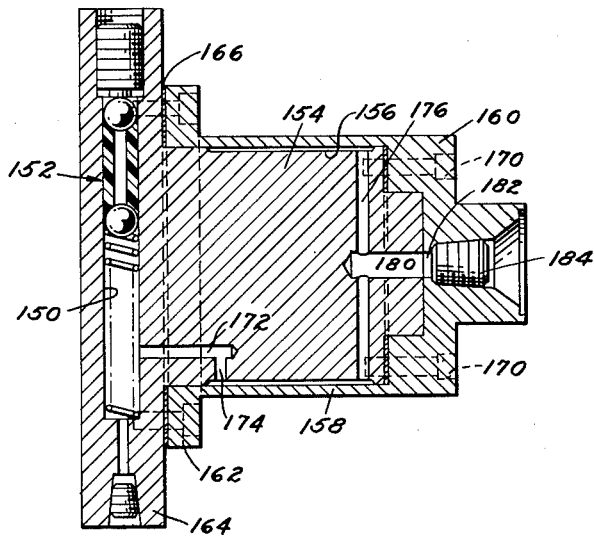

United States Patent Office 2,797,604
Patented July 2, 1957

2,797,604

HYDROSTATIC HOLDING DEVICE

George L. Atherholt, Flint, and George L. Atherholt, Jr., Ferndale, Mich.

Application February 5, 1954, Serial No. 408,508

5 Claims. (Cl. 82—44)

This invention relates to a hydrostatic holding device and particularly to that type of device which is called an "expanding mandrel" or "chuck" for either external or internal holding units.

Devices of this hydrostatic type are illustrated in the Christman Patent 1,818,042 of August 11, 1931, and the Conradson Patent 2,318,838 of May 11, 1943. Our co-pending application Serial No. 359,886, filed June 5, 1953, relates also to similar devices.

The present invention constitutes an improvement on previous constructions in providing a pressure arbor unit which is more easily manufactured and less subject to destruction by excessive pressure. In cases where extremely high pressure is required, it is extremely important that the parts be machined as accurately as possible prior to assembly; and it is important also that during assembly the parts be subject to as little heat as possible to prevent expansion.

In previous assemblies where it has been necessary to weld both ends of the expanding sleeve, the expansion due to the heat of welding has been a disadvantage since subsequent shrinkage is apt to weaken the weld and the expansion during the heating results in strains which are not removd when the metal cools.

It is an object of the present constructions to provide not only parts for assembly which can be more accurately machined but parts which can be assembled with only one weld in some cases and assembled with bolt pressure in other cases to avoid the application of so much heat to the device during the construction.

Other objects and features of the invention will be apparent in the following description and claims.

Drawings accompany the specification, and the various views thereof may be briefly described as:

Figure 1, a sectional view of an elongate arbor showing the relationship of the parts.

Figure 2, a sectional view of a flanged arbor utilizing the principles of the present invention.

Figure 3, a sectional view of an elongate arbor showing a bolted construction.

Figure 4, a sectional view of a flanged arbor using a bolted construction.

Referring to the drawings, it will be seen that each of the embodiments shows two telescoping parts which form the main body of the pressure-expanded mandrel. In Figure 1, the main body portion 10 is cylindrical with a central passage 12 for the pressure unit 16. The surface of the member 10 is circumferentially recessed at 18, said recess being connected to the pressure chamber through radial passages 20 and 22 and a central passage 24. The central passage communicates with an enlarged passage 26 through a passageway 28 threaded to receive a threaded plug 29.

The other expanding portion of the device consists of a main head portion 30 centrally bored at 32 to provide a passage leading to the bore 26 and tapped to receive a plug 34. The body 30 has a cylindrical, thin-walled extension 36 which overlies the recess 18 to form a closed annular chamber. The interior cylindrical recess of the extension 36 terminates in a shoulder 38 and ensmalls to a cylindrical recess 40 which receives a cylindrical extension 42 on the main body. At this point O-rings 44 are provided in suitable matching annular recesses to facilitate the sealing of the parts of these matching surfaces, which are carefully machined for close fit.

The parts are joined together by a single annular weld 50 where the sleeve extension 36 abuts a shoulder 52 on the main body 10. This single weld can be accomplished without undue expansion of the sleeve 36. Due to the fact that the sleeve 36 is formed as a part of the head portion 30 it can be more accurately machined than if formed as a separate thin sleeve so that the telescoping parts fit accurately together. Pressure is developed by the unit 16 as fully described in the aforesaid co-pending application.

In Figure 2 a flange type of mandrel is shown wherein the pressure unit is shown generally at 60 in a diametric passage 62 in a flanged portion 64. On this flanged portion the thin-walled sleeve extension 66 is formed with a cylindrical opening 68 which ensmalls at shoulder 70 to a cylindrical opening 72. The internal body portion of the mandrel is formed by a cylindrical piece 74 reduced in cross section at 76 to provide a shoulder for a weld 80 between the sleeve 66 and the body 74. Underlying the sleeve 66 is an annular recess 82 connected by passages 84 and 86 to a passage 88 leading to the bore 62. One end of passage 88 is blocked by a plug 90 after the device is filled with the non-compressible grease which transmits the expanding force to the sleeve 66.

In Figure 3 a modified construction is shown in which the parts are bolted together instead of being welded. In this embodiment the portion which forms the internal body starts as a head portion 100 which is flanged at 102 and which has a cylindrical extension 104 provided with an annular surface recess 106 extending throughout most of its length. These head and body portions are centrally bored to provide a filling passage 108 eventually plugged by the threaded plug 110.

A plug 112 serves to close the central passage 114 unless it is desired to pass a removal rod through the unit to remove the pressure device, as will be later described. A radial passage 116 connects passage 108 to the recess 106, which is again connected by radial passage 118 to the central passage 114. The expanding sleeve portion of this unit starts as a tail portion 120 having in a central bore a sealing unit 122 of the type fully described in our co-pending application above identified. This tail portion is splined at 123 to receive a special part and has a thin-walled sleeve extension 124 which terminates in a radial flange 126, bolted to flange 102 by transfixing bolts 130.

The contacting cylindrical portions of the member 104 and the interior of the sleeve 124 are accurately made to fit very closely. A shoulder 132 at the end of member 104 terminates in a reduced portion 134 which telescopes into a recess 136 of the tail portion 120. A vegetable fiber gasket 138 is provided at this shoulder 132, and a similar gasket 140 is interposed between the flanges 102 and 126 for aiding in the sealing of the units.

In Figure 4 a flanged type of mandrel is shown with a diametric passage 150 provided with a pressure unit 152 as described in the aforesaid co-pending application. The flange has a body extension 154 provided with a recessed surface 156 which forms an expansion chamber with a sleeve portion 158 extending from a second body portion 160.

A flange 162 is bolted against the main flange 164 with a vegetable fiber gasket 166 interposed between the flanges. Bolts 170 also pass through the portion 160 to thread into the face of the body 154. A longitudinal passage 172 has a radial connection 174 to the pressure chamber 156, and a second radial passage 176 leads to a central passage 180 in head 154 aligned with a central passage 182 in body 160. A screw plug 184 closes the passage 182 when the device is filled with a non-compressible liquid, such as grease, which is used to transmit the pressure throughout the device to the expanding walls 158.

I claim:

1. A hydrostatic expanding mandrel of the type having a thin annular expansion chamber comprising, a body element having a cylindrical recessed portion and having a flange thereon, a head element telescopingly fitted on said body element and having a thin-walled cylindrical extension overlying said recessed portion, the outer end of said extension having a flange, means including bolts securing said flanges together in sealed relation, the other end of said head element and said body element being secured together by means including slidably interengaging portions thereon, and sealing means associated with said interengaging portions.

2. A hydrostatic expanding mandrel of the type having a thin annular expansion chamber comprising, a body element, a head element, said head element having an integral thin walled cylindrical extension telescopingly overlying said body element, said extension and portions of said body element adjacent thereto cooperating solely to form a thin closed annular expansion chamber, means fastening the outer end of said extension in sealed relation to said body element on one side of said chamber, the end portion of said head element opposite said outer end of said extension and said body element being secured together on the other side of said chamber by means including slidably interengaging portions thereon.

3. A hydrostatic expanding mandrel of the type having a thin, annular expansion chamber, comprising, a body element having a generally cylindrical recessed portion, said body element having a bore therein, a head element telescopingly fitted on said body element and having a thin-walled cylindrical extension overlying said recessed portion to define said expansion chamber, said head element also having a bore therein, the outer end portion of said extension being secured in sealed relation to said body element, the other end of said head element and said body element being secured together by means including slidably interengaging portions thereon, closure means for said bores in said body element and head element, passageway means interconnecting said bores and said expansion chamber, said bores, closure means, passageway means and expansion chamber co-operating to define a pressure-containing system, and means in said system operable to produce pressure therein for expanding said extension.

4. The expanding mandrel defined in claim 3, wherein said outer end portion of said extension is secured to said body element by means including bolts.

5. The expanding mandrel defined in claim 3, wherein said outer end portion of said extension is welded to said body element.

References Cited in the file of this patent

UNITED STATES PATENTS

| 1,818,042 | Christman | Aug. 11, 1931 |
| 2,318,838 | Conradson | May 11, 1943 |
| 2,630,039 | Klemm | Mar. 3, 1953 |

FOREIGN PATENTS

| 268,271 | Switzerland | Aug. 16, 1950 |